United States Patent [19]

Malon et al.

[11] Patent Number: 4,530,703

[45] Date of Patent: Jul. 23, 1985

[54] CROSS-LINKED POLYARYLENE OXIDE MEMBRANES

[75] Inventors: Raymond F. Malon, Edmundson; Anthony Zampini, St. Louis, both of Mo.

[73] Assignee: Monsanto Company, St. Louis, Mo.

[21] Appl. No.: 509,636

[22] Filed: Jun. 30, 1983

[51] Int. Cl.$^3$ ............................................. B01D 53/22
[52] U.S. Cl. .......................................... 55/16; 55/158
[58] Field of Search ............................... 55/16, 68, 158; 210/500.2

[56] References Cited

U.S. PATENT DOCUMENTS

| | | | |
|---|---|---|---|
| 3,226,361 | 12/1965 | Borman | 260/47 |
| 3,262,892 | 7/1966 | Hay | 260/2.2 |
| 3,262,911 | 7/1966 | Hay | 260/47 |
| 3,330,806 | 7/1967 | Borman | 260/47 |
| 3,334,069 | 8/1967 | Borman | 260/47 |
| 3,350,844 | 11/1967 | Robb | 55/16 |
| 3,375,225 | 3/1968 | Keane et al. | 260/47 |
| 3,375,298 | 3/1968 | Fox | 260/830 |
| 3,396,146 | 8/1968 | Schmukler | 260/47 |
| 3,417,053 | 12/1968 | Chalk | 260/47 |
| 3,422,062 | 1/1969 | Segal et al. | 260/47 |
| 3,479,390 | 11/1969 | Blatz et al. | 260/468 |
| 3,616,607 | 11/1971 | Klass et al. | 55/16 |
| 3,657,113 | 4/1972 | Stancell et al. | 55/16 X |
| 3,709,774 | 1/1973 | Kimura | 55/16 X |
| 3,735,559 | 5/1973 | Salemme | 55/16 |
| 3,762,136 | 10/1973 | Kimura | 55/158 |
| 3,775,308 | 11/1973 | Yasuda | 210/500.2 X |
| 3,780,496 | 12/1973 | Ward et al. | 55/16 |
| 3,846,521 | 11/1974 | Osterholtz | 55/16 X |
| 3,852,388 | 12/1974 | Kimura | 55/16 X |
| 3,980,456 | 9/1976 | Browall | 55/158 |
| 4,046,843 | 9/1977 | Sano et al. | 264/22 |
| 4,230,463 | 10/1980 | Henis et al. | 55/16 |
| 4,318,714 | 3/1982 | Kimura et al. | 55/16 |
| 4,364,759 | 12/1982 | Brooks et al. | 55/487 |
| 4,399,035 | 8/1983 | Nohmi et al. | 210/500.2 |

FOREIGN PATENT DOCUMENTS 0031730  7/1981  European Pat. Off.

OTHER PUBLICATIONS

PB 81-147787 (NTIS), and PB 82-103920 (NTIS) Final Report submitted to OWS&T, U.S. Department of Interior, (Cabasso).

Hwang et al., Techniques of Chemistry, vol. VII, Membranes in Separations, Chapter 12, John Wiley & Sons, 1975.

*Primary Examiner*—Robert H. Spitzer
*Attorney, Agent, or Firm*—H. Croskell

[57] ABSTRACT

Covalently-bonded, cross-linked polymeric gas separation membranes of a polyarylene oxide precursor and a chemical cross-linking agent. Apparatus and processes utilizing such membranes for selectively separating at least one gas from a gaseous mixture by permeation.

Membranes include substituted phenylene oxide polymers cross-linked with ammonia.

13 Claims, No Drawings

CROSS-LINKED POLYARYLENE OXIDE MEMBRANES

BACKGROUND OF THE INVENTION

This invention relates to covalently-bonded cross-linked polymeric membranes and to apparatus and processes utilizing such membranes for selectively separating at least one gas from a gaseous mixture by permeation.

The separating, including upgrading of the concentration of, at least one selective gas from a gaseous mixture is an especially important procedure in view of the demands on the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation the membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture. However, in order for selective separation of the one or more desired gases by the use of separation membranes to be commercially attractive, the membranes must satisfy several criteria so that the use of the separation procedure is economically attractive. For instance the membranes must be capable of withstanding the conditions to which they may be subjected during the separation operation. The membranes also must provide an adequately selective separation of one or more desired gases at a sufficiently high flux, that is, permeation rate of the permeate gas per unit surface area. Thus, separation membranes which exhibit adequately high selective separation but undesirably low fluxes, may require such large separating membrane surface area that the use of these membranes is not economically feasible. Similarly separation membranes which exhibit a high flux but low selective separation are also commercially unattractive. Furthermore membranes which are not capable of maintaining the desired high flux and selective separation over extended periods of time adverse operating environments are likewise economically not feasible. Adverse environmental conditions include extremes of temperature, pressure and concentrations of chemical contaminants. Accordingly, work has continued to develop gas separation membranes which can provide both an adequately selective separation of one or more desired gases at a sufficiently high flux for an extended period of time under adverse environmental conditions such that the use of these gas separation membranes is economically feasible.

In general, the passage of a gas through a membrane may proceed through pores, i.e., continuous channels for fluid flow in communication with both feed and exit surfaces of the membrane (which pores may or may not be suitable for separation by Knudsen flow of diffusion); in another mechanism, in accordance with current views of membrane theory the passage of a gas through the membrane may be by interaction of the gas with the material of the membrane. In this latter postulated mechanism, the permeability of a gas through a membrane is believed to involve the solubility of the gas in the membrane material and the diffusion of the gas through the membrane. The permeability constant for a single gas is presently viewed as being the product of the solubility and diffusivity of that gas in the membrane. A given membrane material has a particular permeability constant for passage of a given gas by the interaction of the gas with the material of the membrane. The rate of permeation of the gas, i.e., flux, through the membrane is related to the permeability constant, but is also influenced by variables such as the membrane thickness, the physical nature of the membrane, the partial pressure differential of the permeate gas across the membrane, the temperature and the like.

It has been generally observed that materials which exhibit good separation of gases often have lower permeability constants compared to those of materials exhibiting poor separation of gases. In general, efforts have been directed to providing the material of a gas separation membrane in as thin a form as possible, in view of the low permeabilities, in order to provide adequate flux yet provide a membrane as pore-free as possible, such that gases are passed through the membrane by interaction with the material of the membrane. One approach to developing separation membranes suitable for gaseous systems has been to provide composite membranes having a superimposed membrane supported on an anisotropic porous support wherein the superimposed membrane provides the desired separation, i.e., the superimposed membrane is semi-permeable. The superimposed membranes are advantageously sufficiently thin, i.e., ultrathin, to provide reasonable fluxes. The essential function of the porous support is to support and protect the superimposed membrane without harming the delicate, thin superimposed membrane. Suitable supports are desirably porous to provide low resistance to permeate passage after the superimposed membrane has performed its function of selectively separating the permeate from the feed mixture. Klass et.al., U.S. Pat. No. 3,616,607; Stancell et.al., U.S. Pat. No. 3,657,113; Yasuda, U.S. Pat. No. 3,775,303; and Browall, U.S. Pat. No. 3,980,456 exemplify gas separation membranes having superimposed membranes on a porous support.

Such composite membranes for gas separations have not been without problems. For instance, Browall discloses that in the fabrication of composite membranes of ultrathin films fine particles (i.e., particles below about 3000 Angstroms in size) may be deposited under or between preformed ultrathin membrane layers and, because of their large size in comparison to the ultrathin membranes, puncture the ultrathin membranes. Such breaches reduce the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membrane and the porous polycarbonate support as an adhesive. Thus the composite membranes of Browall are complex in materials and techniques of construction.

A major improvement in gas separation membranes is disclosed by Henis et.al. in U.S. Pat. No. 4,230,463 which pertains to particular multicomponent membranes for gas separations comprising a coating in contact with a porous separation membrane wherein the separation properties of the multicomponent membranes are principally determined by the porous separation membrane as opposed to the material of the coating. Such multicomponent membranes for the separation of at least one gas from a gaseous mixture can exhibit a desirable selectivity and still exhibit a useful flux. Moreover, such multicomponent membranes for gas separation can be fabricated from a wide variety of gas separation membrane materials allowing great latitude in selecting such a membrane material which is advantageous for a given gas separation. The desired combinations of flux and selectivity of separation can be provided by the configuration and methods of preparation and combination of the components. For instance, a material having high selectivity of separation, but a relatively low permeability constant, can be utilized to provide multicomponent membranes having desirable permeation rates and desirable selectivity of separation.

Despite such advances in gas separation membranes it would be advantageous to construct any membrane, including such multicomponent membranes, from materials that have normally high flux and the desired selectivity of separation but also have stable environmental resistance. That is, the membranes should have high structural strength, toughness, abrasion and chemical resistance to remain functional under extremes of pressure and differential pressure. In this regard such membranes are often required to operate with pressure differentials across the membrane of at least 2000 to 3500 Kilo Pascals (kPa) or higher, for instance up to 14,000 kPa or even higher. Depending on the operating environment chemical resistance is also desirable for instance resistance to hydrocarbons, ammonia, water and acid gases such as carbon dioxide and hydrogen sulfide is often required. Such chemicals may have a tendency to dissolve or plasticize the material of gas separation membranes resulting in deterioration of the membrane or densification of an otherwise asymmetric structure.

Polyarylene oxides have been recognized as material of some potential in the membrane separation field. For instance, Robb in U.S. Pat. No. 3,350,844 disclosed that polyarylene oxide membranes, for instance membranes of 2,6-dimethylphenylene oxide membranes, have unique properties such as a high separation factor and flux together with strength and ability to form thin films. Robb further discloses that factors such as temperature, pressure, elongation of oriented membrane material, the amount of crystallinity, among others, in the polyarylene oxide resin, may effect permeability. In this regard polyphenylene oxide resins have a low resistance to most common organic solvents. Aromatic and chlorinated hydrocarbon solvents dissolve polyphenylene oxide polymers, while other solvents and solvent vapors induce crazing in molded polyphenylene oxide parts under stress thus causing almost complete loss of strength.

See also Kimura, U.S. Pat. Nos. 3,709,774; 3,762,136; and 3,852,388 which relate to membranes of polyxylene oxide with the same apparent disadvantages.

An alternative form of polyarylene oxide membranes is disclosed by Salemme in U.S. Pat. No. 3,735,559 where various ionic forms of a sulfonated polyxylylene membrane are disclosed. Among the disadvantages discussed are that it is necessary to preshrink such membranes to avoid rupturing; the hydrogen ion form is unstable and may undergo sulfone formation resulting in cross-linking or may, in the presence of water, undergo hydrolysis with the liberation of sulfuric acid; various counter ion salt forms of the membrane are stable and will avoid detrimental cross-linking but such membranes may densify in the presence of water.

In summary suitable polyarylene oxide membranes have not been provided for gas separations which can exhibit sufficient flux and selectivity of separation for general commercial operations in the presence of adverse environmental conditions as the presence of chemical contaminants, extremes of differential pressure and temperature.

SUMMARY OF THE INVENTION

The present invention provides gas separation membranes comprising covalently bonded cross-linked polymer of a polyarylene oxide precursor and a chemical cross-linking agent. Preferred polyarylene oxide precursor includes those polyarylene oxides having halogenated alkyl groups or halogenated acyl groups. Preferred chemical cross-linking agents include ammonia and aqueous solutions of ammonium hydroxide. Membranes can have an asymmetric wall structure with a thin dense skin. When the thin dense skin is porous it is preferred that the membrane have a coating in occluding contact with the pores of the thin dense skin. A preferred form of such membranes is a hollow fiber membrane.

DEFINITION OF TERMS

In the description of the present invention the following definitions are used.

The term "cross-liked polymer" as used in this application means that polymer chains of polyarylene oxide are bonded to one and another. The fact that the polymer is stable, that is, does not swell or dissolve in solvents for polyarylene oxide, is indicative of cross-linking.

The term "covalently bonded" as used in this application means that the cross-linking of polymer chains is effected by chemical bonding of atoms which share electrons. Covalent bonds may range from non-polar, involving electrons evenly shared by two atoms, to extremely polar, where the bonding electrons are very unevenly shared. Covalent bonds are not intended to mean that chemical bonding where the uneven sharing is such that the bonding electrons spend substantially full time with one of the atoms as in ionic bonding.

The term "membrane" as used in this application refers to material having surfaces which can be contacted with a fluid mixture such that on fluid of the mixture selectively permeates through the material. Such membrane can generally be disposed in film- or hollow fiber-form. Membranes can be porous, or essentially pore-free, or have layers that are porous and layers that are essentially pore-free. This invention provides membranes exhibiting advantageous gas separation properties. However the membranes of this invention will exhibit useful and advantageous liquid separation properties depending on the morphology of the membrane.

The term "dense", or "dense film", membranes as used in this application means membranes which are essentially free of pores, i.e., fluid channels communicating between surfaces of the membrane, and are essentially free of voids, i.e., regions within the thickness of the membrane which do not contain the material of the membrane. Since a dense membrane is essentially the same throughout the structure, it falls within the definition of isotropic membranes. Although some of these dense membranes are fairly selective, one of their disadvantages is low permeate flux due to the relatively large thickness associated with the membranes. Dense membranes are useful in determining intrinsic gas separation properties of a material. Intrinsic separation properties include separation factor, α, and permeability constant, P, both of which are defined below.

The term "asymmetric" or "anisotropic" membranes as used in this application means membranes which have a variable porosity across the thickness of the membrane. Exemplary of an asymmetric membrane is what is called a Loeb membrane, which is composed of two distinct regions made of the same material—a thin dense semi-permeable skin and a less dense, void containing support region.

The membranes of this invention comprise materials in film- or hollow fiber-form which have particular relationships. Some of these relationships can conveniently be stated in terms of relative separation factors with respect to a pair of gases for the membranes which may, optionally, have coatings. A separation factor ($\alpha a/b$) for a membrane for a given pair of gases a and b is defined as the ratio of the permeability constant ($P_a$) of the membrane for a gas a to the permeability constant ($P_b$) of the membrane for gas b. A separation factor is also equal to the ratio of the permeability $(P/l)_a$ of a membrane of thickness l for gas a of a gas mixture to the permeability of the same membrane to gas b, $(P/l)_b$. The permeability for a given gas is the volume of gas at standard temperature and pressure (STP), which passes through a membrane per square centimeter of surface area, per second, for a partial pressure drop of 1 centimeter of mercury across the membrane per unit of thickness, and is expressed in units of $cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors is disclosed by Hwang et. al., *Techniques of Chemistry, Volume VII, Membranes in Separations*, John Wiley & Sons, 1975 (herein incorporated by reference) at Chapter 12, pages 296 to 322.

Unless otherwise noted, all permeabilities are reported herein at standard temperatures and pressures of 15.6° C. and 100 kPa, respectively. The permeabilities are reported in gas permeation units (GPU), which are $cm^3(STP)/cm^2\text{-sec-cmHg} \times 10^6$; thus 1 GPU is $1 \times 10^{-6} cm^3(STP)/cm^2\text{-sec-cmHg}$.

"Polyarylene oxide" as used in this application represents a composition of matter having a repeated structural unit of the formula:

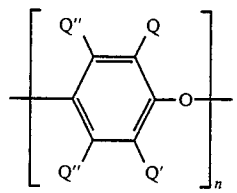

wherein the oxygen atom of one unit is connected to the benzene nucleus of the adjoining unit; n is a positive integer of at least 100; Q is a monovalent substituent selected from the group consisting of hydrogen, aliphatic hydrocarbon radicals free of a tertiary α-carbon atom arylhydrocarbon radicals, and hydrocarbonoxy radicals having at least two carbon atoms and being free of an aliphatic tertiary α-carbon atom; Q' is a monovalent substituent which is the same as Q or different and may include halogen; and Q" is the same as Q' or different and in addition nitro and sulfono.

Preferred polyarylene oxide has repeated structural units of the formula:

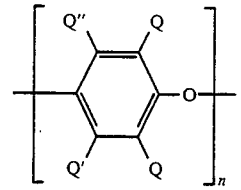

wherein Q is an aliphatic hydrocarbon radical of 1 to 4 carbon atoms; and Q" is a monovalent substituent selected from the group consisting of hydrogen, halogen, nitro, sulfono, acyl radicals having at least two carbon atoms, and alkyl radicals having from 1 to about 4 carbon atoms.

A more preferred polyarylene oxide is poly(2,6-dimethyl-1,4-phenylene oxide) and such polymer with 3 or 5 position substituents selected from the group consisting of hydrogen, halogen, nitro, sulfono and acyl radicals having at least two carbon atoms, and alkyl radicals having from 1 to about 4 carbon atoms.

DESCRIPTION OF A PREFERRED EMBODIMENT

This invention provides gas separation membranes comprising covalently bonded crosslinked polymers of a polyarylene oxide precursor and a chemical cross-linking agent. The polyarylene oxide precursor which is useful in such a covalently bonded cross-linked polymer will generally have at least 0.01 substituents per arylene oxide unit wherein said substituents are selected from the group consisting of halogenated alkyl groups or halogenated acyl groups. Preferably the halogenated alkyl group or halogenated acyl group will have from 1 to 4 carbon atoms. Such halogenated alkyl groups can be, for instance, halomethyl, haloethyl, halopropyl, haloisopropyl, halobutyl or haloisobutyl. The preferred halogens are chlorine or bromine; however fluorine or iodine may be useful in some cases. The most preferred halogen is bromine. The simplest halogenated alkyl group is the halomethyl group where the one carbon alkyl group is generally referred to as a benzylic group.

Among the halogenated acyl groups are the halogenated acetyl, propionyl, including isopropionyl, and buturyl, including isobuturyl. The preferred halogens are chlorine and bromine where chlorine is the most preferred halogen. The most preferred halogenated acyl groups include halogenated acetyl and halogenated propionyl for instance chloroacetyl and chloropropionyl.

Among the chemical cross-linking agents used to form covalently bonded cross-linked polymers which are useful for the gas separation membranes of this invention are ammonia and solutions of ammonia, such as aqueous solutions of ammonium hydroxide. Other useful cross-linking agents comprise compounds selected from the group consisting of non-sterically hindered primary amines, such as methylamine, ethylamine, n-propylamine, n-butylamine and aniline and the like; secondary monoamines, such as dimethylamine, ethylmethylamine and the like; heterocyclic polynitrogen-containing compounds, such as piperazines, imidazoles and trazoles; primary polyamines, such as ethylenediamine, tetramethylenediamine, hexamethylenediamine and the like; secondary polyamines and compounds such as thiosemicarbazide and bis-dimethylamino-2-propanol. Such compounds contain at least one nitrogen atom which is covalently bonded to provide cross-linkage between polyarylene oxide precursors. Still other chemical cross-linking agents comprise compounds selected from the group consisting of water and aqueous base solutions.

Generally it is preferred that cross-linking extends substantially throughout the membrane. In some cases the cross-linking can extend across a part of the membrane for instance in the region near the surface of the membrane, for instance by cross-linking with a vapor of a polymeric amine or other cross-linking agent of such a molecular size that it does not readily penetrate the membrane. Preferred gas separation membranes have an asymmetric wall structure with a thin dense skin. Often the thin dense skin has pores; a gas separation membrane where the thin dense skin has pores can be effective where the membrane has a coating in occluding contact with the pores of the thin dense skin. More preferred membranes are those which are hollow fiber membranes.

FORMATION OF POLYARYLENE OXIDE PRECURSOR

The polyarylene oxide precursor useful in this invention will have at least 0.01 substituents per arylene oxide unit where said substituents are selected from the group consisting of halogenated alkyl groups or halogenated acyl groups.

A preferred method of forming the polyarylene oxide precursor having halogenated alkyl groups substituents is to halogenate an alkylated polyarylene oxide. Such alkylated polyarylene oxides can comprise a poly(2,6-dialkyl-1,4-phenylene oxide), such as a poly(2,6-dimethyl-1,4-phenylene oxide). Halogenation of the alkyl group occurs generally at the benzylic carbon.

The halogenation can be effected by addition of a halogen to a solution of the polyarylene oxide in a solvent, for instance a halogenated solvent, such as chlorobenzene. The preferred halogenating agents include chlorine, bromine chlorine-producing compounds and bromine-producing compounds. The halogenating agent is added to the solution of polyarylene oxide under conditions to control halogenation. Halogenation will tend to occur by free radical reaction at higher temperatures. Under such free radical reaction halogen will be added to the benzylic carbon. Halogenation tends to occur by electrophilic substitution at lower temperatures. Under such electrophilic substitution the halogen is added to the aromatic ring. For instance, in the bromination of a solution of poly(2,6-dimethyl-1,4-phenylene oxide) in chlorobenzene by the addition of bromine, electrophilic substitution predominates at lower temperatures, for instance temperatures lower than about 80° C., for instance at about 0° C. or even lower, and free radical substitution predominates at higher temperatures, for instance under reflux conditions at temperatures of about 130° C. Halogenation by both free radical substitution and electrophilic substitution can occur at intermediate temperatures.

In some instances it may be desired to conduct halogenation under conditions under which free radical substitution predominates to produce a polyarylene oxide precursor with halogen primarily on a benzylic carbon. In other instances it may be desirable to provide a polyarylene oxide precursor with some halogen directly substituted onto the aromatic ring. Such halogen substituted onto the aromatic ring does not freely react in subsequent cross-linking operations but may provide desirable properties for membrane gas separation.

A preferred method of forming a polyarylene oxide precursor having a halogenated acyl group is to add a halogenated acyl group onto the aromatic ring by electrophilic substitution.

The halogenated polyarylene oxide precursor can be recovered by precipitation in a non-solvent, for instance such as methanol. Other recovery steps include filtration, washing with such non-solvent and drying for instance at elevated temperatures and reduced pressures.

FORMATION OF DENSE FILM MEMBRANES

Dense film membranes are a useful analytical device for determining intrinsic gas separation properties of a polymeric material. For instance a halogenated polyarylene oxide precursor can be dissolved in a solvent such as chloroform to produce a solution from which a dense film can be cast. Generally a solution comprising about 5 to 10 weight percent of the halogenated polyarylene oxide precursor polymer is poured on a glass plate. A casting knife is drawn over the solution to provide a uniform desired thickness. After drying in a vacuum oven a dense film can be released from the glass by immersion in deionized water. After further drying in a vacuum oven the dense film can be used to determine intrinsic gas separation membrane properties.

A sample of the dense film membrane, often a circular disc, is inserted into a test cell having a feed gas chamber and a permeate gas chamber at opposing sides of the membrane which is supported by a ring on the permeate side of the membrane. A gas mixture, for instance consisting of about 20 to 25 percent of one gas of a predominately binary gas mixture such as of carbon dioxide and methane, is passed to the feed gas mixture side of the membrane at a flow rate of about from 2 to 10 cc/min and at a constant pressure in the range of from about 200 to 600 cmHg. Such feed gas flow rates are established at a rate substantially greater than the permeate flow rate to ensure constant feed gas composition. The permeate side of the membrane is evacuated continuously until the gas permeation reaches a steady state condition. The permeate gas flow rate is determined by allowing the permeate gas to enter an evacuated chamber while monitoring the rate of pressure increase in the evacuated chamber, for instance by using a capacitance manometer such as an MKS Baratron ® CAPACITANCE MANOMETER.

A sample of the permeate gas is collected in a known volume to a pressure of about 4–5 torr and injected via a gas sample valve into a gas chromatograph to determine the permeate composition. The composition of the permeate gas in combination with the rate of pressure rise is then used to calculate intrinsic permeabilities $P_i$ of the membrane for gas species "i", which can be determined from the following equation:

$$P_i = \frac{E\,R\,1\,V}{760\,A\,\Delta p_i} \qquad (1)$$

where R is the measured rate of pressure rise in the evacuated chamber, measured in mm/sec, E is the mole fraction of species "i" in the permeate, V is the volume of the evacuated chamber into which the sample is collected, measured in cm$^3$ (STP), 1 is the membrane thickness, measured in cm, A is the membrane surface area, measured in cm$^2$, and $\Delta p_i$ is the average partial pressure differential for species "i" across the membrane film, measured in cmHg.

Membranes are determined to be at steady state when the measured values for permeability and separation factor remained constant with time.

Intrinsic separation factors, $a_j^i$, are estimated from the permeate and feed gas composition by:

$$a_j^i = \frac{\frac{[C_i]}{[C_a]}, \text{ permeate}}{\frac{[C_i]}{[C_j]}, \text{ feed gas}}$$

FORMING HOLLOW FIBER MEMBRANES

Halogenated polyarylene oxide precursor polymer can be formed into hollow fiber membranes by employing a wide variety of extrusion conditions such as fiber-forming spinning techniques which are known to those skilled in the synthetic fiber-forming industries. The fiber-forming polymer solution comprising halogenated polyarylene oxide precursor material dissolved in a liquid carrier comprising a suitable solvent is prepared. In general the concentration of the precursor material in the solution is sufficient to form polymeric hollow fibers of the halogenated polyarylene oxide precursor material by dry and/or wet spinning techniques. The polymer concentration can vary over a wide range and depends on the characteristics desired in the final hollow fiber membrane. A maximum concentration is, of course, limited to that where the polymer solution is not amenable to extrusion through a spinnerette. Correspondingly, the lower limit is where the polymeric precursor hollow fiber does not have sufficient polymer to maintain its wall structure. In general the polymer concentrations will be from about 20 to about 70 percent by weight of the polymer solution.

The solvents used in the preparation of the polymer solution can be any number of those well known to those skilled in the art. For instance such solvents as N-formylpiperidine, N-methyl-2-pyrrolidone, etc., are particularly useful with such polymers of halogenated polyarylene oxide. Obviously the solvent selected should be a good solvent for the organic polymer and should be amenable to the dry or wet spinning techniques contemplated in the subsequent steps of the process.

Ambient or somewhat higher temperatures are usually quite adequate for the preparation of the polymer solution. Dependent on polymer and/or solvent utilized, higher or lower temperatures may aid the preparation but are not considered critical.

It is often desirable to use wet spinning techniques to produce a hollow fiber membrane having an asymmetric wall structure. It is further often desirable that such membranes having an asymmetric wall structure also have a thin dense skin. It is often preferred to produce such hollow fiber membranes by wet spinning techniques where the hollow fiber is extruded from a spinnerette and passed through a coagulating bath. Such techniques are exemplified for instance in U.S. Pat. No. 4,364,759, incorporated herein by reference.

To assist in hollow fiber membrane formation it is desirable that the liquid carrier have non-solvents added to the polymer solution. Non-solvents are generally characterized by exhibiting little capability of dissolving the polymer of halogenated polyarylene oxide precursor material. The non-solvent preferably exhibits little, if any, swelling action on the polymer of halogenated polyarylene oxide. The non-solvent, if added in a sufficient amount, is usually capable of resulting in a phase separation in the polymer solution. Preferably, the non-solvent is not added in an amount such that the polymer solution is unduly unstable under processing conditions prior to forming the hollow fiber precursor. Frequently the amount of non-solvent in the solution is at least about 1 part by weight per 100 parts by weight of liquid carrier. Preferably, the addition of relatively small quantities of liquid coagulant to a solution of the polymer in the liquid carrier will result in phase separation or gelling of the polymer. Typical non-solvents may include acetic acid, sulfolane and the like.

It is also often desired to incorporate a stabilizer into the liquid carrier. Such stabilizers are desirable to prevent the reaction of possible impurities within the solvent from reacting with the halogenated polyarylene oxide. For instance a solvent such as N-formylpiperidine may contain impurities such as amines or water which could react with the active halogen of the halogenated polyarylene oxide resulting in a phase separation or gelling of the polymer. Useful stabilizers include acid anhydrides, preferably of water soluble acids, such as acetic anhydride. Generally such stabilizer can be present from 1 to 10 parts by weight per 100 parts by weight of liquid carrier.

The fiber-forming solution of halogenated polyarylene oxide and liquid carrier are mixed sufficiently to completely dissolve the halogenated polyarylene oxide. To avoid difficulties in hollow fiber spinning it is often desirable to remove entrained air from the fiber-forming solution. High temperatures and low pressures are often useful in such deaerating operations.

Hollow fiber membranes can be formed by extruding the fiber-forming solution from a spinnerette while injecting a fluid into the bore of the nascent hollow fiber at a sufficient rate to maintain the bore of the nascent hollow fiber open. The injection fluid is preferably highly miscible with the liquid carrier and often, therefore, comprises water. The nascent hollow fiber is then contacted with a liquid coagulant which is a non-solvent for the halogenated polyarylene oxide. The liquid coagulant is preferably highly miscible with the liquid carrier and the injection fluid. Usually the temperature of the liquid coagulant is sufficiently low that the polymer solution at that temperature is extremely viscous and may even be a gel. The contact of the nascent hollow fiber with the liquid coagulant is for a sufficient duration to substantially completely coagulate the polymer in the nascent hollow fiber under conditions of the liquid coagulant and thereby provide a hollow fiber. Conveniently, water is employed as the coagulating agent in the coagulating bath. Other coagulating agents may comprise ethylene glycol, polyethylene glycol, propylene glycol, methanol, ethanol and propanol, etc.

The residence time for the nascent hollow fiber in the coagulating bath is at least sufficient to ensure reasonable solidification of the fiber.

The hollow fiber is then washed, that is contacted, with a non-solvent for the polymer which is miscible with the liquid carrier to reduce the content of liquid carrier in the hollow fiber. Such non-solvent for washing may conveniently comprise water. The washed hollow fiber may then be dried at a temperature which does not unduly adversely affect permeability exhibited by the hollow fiber membrane.

CROSS LINKING POLYARYLENE OXIDE MEMBRANES

Membranes of halogenated polyarylene oxide can be cross-linked to provide improved properties. Such cross-linking is facilitated by the presence of active halogens, for instance benzylic halogens, on a halogenated alkyl-substituted polyarylene oxide.

Membranes result from cross-linking which can improve polymer resistance to a number of detrimental effects such as swelling, brittleness, crazing, cracking, reduction of glass transition temperature, say from plasticization, and crystallization which may result from solvent absorption and evaporation. Such adverse effects result from interaction of the polymer of the membrane with chemical agents such as organic chemical solvents which generally effect physical and chemical properties of polymers. Cross-linking provides an improvement in chemical and physical properties of the polymer without deleteriously effecting intrinsic separation properties. Moreover cross-linking often provides significant improvement in separation properties due to changes in the chemical nature of the polymer. Such cross-linked polyarylene oxide membranes exhibit superior performance in separation environments. Such cross-linked membranes generally exhibit increased molecular weight, lower crystallinity and higher glass transition temperatures. Moreover, such cross-linked membranes exhibit increased impact strength, increased resistance to permeability creep and increased environmental resistance.

Cross-linking of halogenated polyarylene oxide membranes can be effected by a wide variety of cross-linking agents which will react with the active halogen. Such cross-linking agents include water, aqueous alkaline solutions, and the like. Preferred cross-linking agents comprise amines and amine solutions. Because of convenience of use the most preferred cross-linking agents include ammonia, either in gaseous form or in solution form.

Cross-linking can be effected by any means of contacting the cross-linking agent with active halogen on the halogenated polyarylene oxide membrane under conditions which do not deleteriously effect the structure of the membrane. In the case of cross-linking with ammonia gas it is generally sufficient to expose the halogenated polyarylene oxide membranes to the ammonia gas, for instance in a confined space. Exposure at mild conditions, for instance ambient temperature and atmospheric pressure, are often sufficient to effect adequate cross-linking. Cross-linking can be effected to a higher degree by employing more severe reaction conditions, for instance higher pressure and/or higher temperature.

In the case of cross-linking of halogenated polyarylene oxide membranes with solutions of cross-linking agent, for instance aqueous solutions of ammonia, other amines or other organic or inorganic bases, effective cross-linking can often be obtained by simply soaking the halogenated polyarylene oxide membrane in the solution for a reasonable time. Of course more extensive cross-linking can be effected by utilizing more severe reaction conditions, for instance higher temperatures.

Hollow fiber membranes are generally preferred over film-type membranes because hollow fiber membranes are generally self-supporting even under extremes of differential pressure in operation. Hollow fiber membranes arranged in bundles can provide a very high ratio of surface area per unit volume occupied by the bundle. Hollow fiber membranes consisting of halogenated polyarylene oxide can be cross-linked prior to assembly into bundles or subsequent to assembly into bundles. For convenience it is often desired to assemble the hollow fiber membranes into bundles and provide the bundles with tube sheets for the hollow fiber membranes prior to cross-linking.

ANISOTROPIC-MEMBRANE-COATINGS

It is generally desirable that anisotropic membranes, including those in hollow fiber form, have as thin a skin as possible so that the membrane exhibit high permeabilities. In fabricating membranes with such thin skin it is often difficult to avoid pores in the skin which are adverse to the separation properties, as exhibited by separation factor, $\alpha$. As disclosed in U.S. Pat. No. 4,230,463 such porous separation membrane can be advantageously utilized by providing a coating in occluding contact with the porous separation membrane.

Coatings can be advantageously utilized with porous separation membranes of this invention comprising covalently bonded cross-linked polymer of polyarylene oxide. Useful coatings include silicone material such as polydimethylsiloxane, which can optionally be cross-linked by the use of a coupling agent such as aminopropyltriethoxysilane with a polysiloxane diol.

CROSS-LINKED POLYARYLENE OXIDE MEMBRANE APPLICATIONS

The cross-linked polyarylene oxide membranes of this invention are useful for a variety of uses where stability of physical properties and resistance to organic solvents is desired. This is especially desirable in membrane separation applications, for instance such as ultrafiltration, reverse osmosis, pervaporation and gas separations. In this regard the cross-linked polyarylene oxide membranes of this invention are particularly useful for gas separation applications. The selection of a gas separation is generally limited only by the operating environment anticipated for the membrane and the separation factor obtainable. A useful application for the membranes of this invention is the membrane gas separation of hydrogen from gas mixtures. It is often desirable to remove hydrogen from gas streams containing a variety of potentially adverse chemical species. For instance, it is often desirable to recover hydrogen from purge gas streams, for instance from ammonia production processes or refinery processes. Such purge gas streams can contain chemical species such as ammonia or hydrocarbons such as alphatic or aromatic hydrocarbons which can be deleterious to polymers heretofore used in membrane gas separation applications. The cross-linked polyarylene oxide membranes of this invention have significantly increased resistance to such chemical species. Accordingly the membranes of this invention can be utilized in gas separation operations without the necessity of extensive pretreatment operations. Moreover the membranes of this invention can be utilized under more severe conditions of pressure and temperature without adverse effects of such chemical species as is exhibited in other membranes.

The cross-linked polyarylene oxide membranes of this invention can also be advantageously used for the separation of solvent-type gases from gas streams. Such solvent-type gases may include carbon dioxide, hydrogen sulfide, water, ammonia and the like. At relatively low levels such gases can adversely affect polymeric membranes by causing swelling or plasticization resulting in degradation of the membrane structure. The cross-linked membranes of this invention are substantially more resistant to the adverse effects of such solvent-type gases. Accordingly the membranes of this invention can be advantageously used in separating gases such as carbon dioxide and/or hydrogen sulfide from hydrocarbon gas streams containing methane and the like.

The invention is further illustrated by, but not limited to, the following examples.

EXAMPLE 1

This example demonstrates the use of bromine as the brominating agent for a polyarylene oxide.

250 g of poly(2,6-dimethyl-2,4-phenylene oxide) having an intrinsic viscosity of 0.508 dl/g, as measured in chloroform at 25° C., was dissolved in 3,200 ml of chlorobenzene in a reactor consisting of a 5 liter 3-neck Morton flask equipped with a mechanical stirrer, addition funnel and a condenser having an acid water trap. The solution was heated via oil bath to boiling and dried by removing 200 ml of distillate. To the boiling solution, 250 g of bromine was added over four hours. The solution was allowed to boil for an additional 30 minutes under a nitrogen sweep. After cooling, the solution was sprayed into 15 liters of methanol to precipitate the halogenated polymer. The halogenated polymer was collected on a filter, washed with methanol and dried at 50° C. under reduced pressure. The yield was 339.5 grams (90 percent of theoretical). The halogenated polymer had a total bromine content of 31.4 percent by weight. Calculations from the integral curve of the proton magnetic resonance spectra of the halogenated polymer showed that bromine was substituted at benzylic carbons at a level of 0.6 bromine per phenylene oxide unit and that bromine was substituted into the aromatic ring at the level of 0.08 bromine per phenylene oxide unit.

EXAMPLE 2

This example demonstrates the use of N-bromosuccinimide as the brominating agent.

11.4 g of poly(2,6-dimethyl-1,4-phenylene oxide), having an intrinsic viscosity of 0.50 dl/g, as measured in chloroform at 25° C., was dissolved in 410 ml of chlorobenzene in a 500 ml 3-neck round bottom flask equipped with a mechanical stirrer, condenser having an acid water trap and a nitrogen inlet tube. Using an oil bath, the polymer solution was heated to 115° C. 16.9 of N-bromosuccinimide were added. While under nitrogen, the reaction mixture was allowed to boil until bromine was no longer observed in the vapor phase over the reaction medium. After cooling to ambient temperature, the reaction mixture was filtered and the product precipitated in methanol. The halogenated polymer was collected, washed with methanol and air dried on the filter. The halogenated polymer was dissolved in 120 ml chloroform and reprecipitated in methanol. Finally, the halogenated polymer was dried four days at 50° C. in a vacuum oven. The yield was 12.0 g (63 percent theoretical). The total bromine content of the halogenated polymer was 36.8 percent by weight. Calculations based on the integral curve of the nuclear magnetic resonance spectra showed that the halogenated polymer was substituted with bromine at the benzylic carbon at a level of 0.65 bromine per phenylene oxide unit and substituted with bromine at the aromatic ring at a level of 0.22 bromine per phenylene oxide unit.

EXAMPLE 3

This example demonstrates a general procedure for introducing bromine at both the aryl and benzylic position of PPO a polyarylene oxide.

30 g of poly(2,6-dimethyl-1,4-phenylene oxide) having an intrinsic viscosity of 0.508 dl/g, as measured in chloroform at 25° C., was dissolved in 450 ml of chlorobenzene in a reactor consisting of a 1000 ml 3-neck round bottom flask equipped with an addition funnel, a mechanical stirrer and a condenser having an acid water trap and a thermometer. Bromine was substituted into the polymer principally at the aromatic ring (aryl bromination) by adding 42 g of bromine over 15 minutes while the solution was maintained at 66°–72° C. The aryl brominated polymer solution was heated to reflux, at a temperature of about 130° C. Under reflux, a condition favorable to benzylic bromination, 22 g of bromine was added over 30 minutes. After reflux for 10 minutes, about 20 percent of the solvent was distilled from the reaction solution. The solution was cooled and the halogenated polymer precipitated in methanol. The halogenated polymer was washed with methanol and dried at 55° C. for five days in a vacuum oven. The yield was 61.5 g (99 percent of theoretical). The halogenated polymer had a total bromine content of 49.3 percent by weight. Calculations based on nuclear magnetic resonance analysis showed that the halogenated polymer was substituted with bromine at benzylic carbon at a level of 0.88 bromine per phenylene oxide unit and substituted with bromine in the aromatic ring at a level of 0.56 bromine per phenylene oxide unit. That is, the benzylic halogen level was 0.88 and the aryl halogen level was 0.56.

EXAMPLE 4

This example demonstrates an alternate method of preparing an aryl-benzylic brominated polyarylene oxide as well as the importance of reaction temperature on bromine distribution in the product.

In this example, 30 g of poly(2,6-dimethyl-1,4-phenylene oxide) having a weight average molecular weight, $\overline{M}w$, of 49,000 was dissolved in 450 ml chlorobenzene in a reactor consisting of a 1000 ml 3-neck round bottom flask equipped as in Example 3. The solution was heated to 115° C. 40 g of bromine was added over 20 minutes. The solution was kept at 115° C. for an additional 30 minutes, then cooled to room temperature. The halogenated polymer was precipitated in methanol, washed with methanol and dried at 50° C. in a vacuum oven. The yield was 48.7 g (97.4 percent of theoretical). The halogenated polymer had total bromine content of 38.98 percent by weight. Nuclear magnetic resonance showed that the halogenated polymer had a benzylic halogen level of 0.38 and an aryl halogen level of 0.6.

EXAMPLES 5-10

These examples illustrate the flexibility in introducing bromine at various levels at the aryl and benzylic positions of a polyarylene oxide.

Aryl brominated poly(2,6-dimethyl-1,4-phenylene oxide) was produced as in Example 3. Benzylic halogenation was also carried out as in Example 3 except that the amount of bromine added to the aryl brominated polymer solution at reflux was varied. The variations in benzylic halogenation are illustrated in Table I.

TABLE I

| Example | Grams of Br₂ Added to Aryl Brominated Polymer Solution at Reflux | Yield (g) | Yield (% theoretical) | Bromine (Wt %) | Bromine Distribution/ Arylene Unit Aryl | Bromine Distribution/ Arylene Unit Benzylic |
|---------|---|---|---|---|---|---|
| 5  | 4.0  | 53 | 100 | 42.6 | 0.92 | 0.19 |
| 6  | 10.0 | 54 | 96  | 44.7 | 0.90 | 0.30 |
| 7  | 16.0 | 56 | 95  | 46.7 | 0.89 | 0.41 |
| 8  | 34.0 | 67 | 99  | 52.9 | 0.91 | 0.75 |
| 9  | 42.0 | 72 | 100 | 55.4 | 0.90 | 0.94 |
| 10 | 54.5 | 77 | 98  | 58.3 | 0.89 | 1.18 |

EXAMPLE 11

This example illustrates casting and measuring intrinsic permeation properties of dense film membranes of halogenated polyarylene oxide.

A halogenated polyarylene oxide polymer was produced as in Example 1 where the polyarylene oxide was poly(2,6-dimethyl-1,4-phenylene oxide). The polyarylene oxide was brominated in a level of 33.4 percent by weight and had a benzylic bromine level of 0.56 and an aryl bromine level of 0.19.

The brominated polyarylene oxide was dissolved in chloroform to produce a clear solution from which a dense film could be cast. The solution comprised about 5 to 10 percent by weight polymer. The solution was filtered through a fritted glass filter with a nominal maximum pore size of 40 to 60 μm and evenly poured across one end of a 17.5×25.5 cm glass plate. A casting knife (doctor blade) was drawn the length of the plate. The cast solution was placed in a vacuum oven and dried for two hours at room temperature under reduced pressure (250–500 mmHg). The dense film was released from the glass plate surface in a deionized water bath and further dried in a vacuum oven (at 50°–80° C.; 250 mmHg) for a period in excess of one day.

A disk having a cross-sectional area of about 10.5 cm² was cut from the dense film. The disk was mounted in a permeation test cell. Intrinsic permeabilities and intrinsic separation factors were calculated from permeation analysis using gas mixtures of $H_2/CO$, $H_2/CH_4$, $CO_2/CH_4$, $O_2/N_2$. The first named gas, i.e., $H_2$, $CO_2$ and $O_2$, were present at levels in the range of about 20–25 percent by volume. The permeabilities and separation factors are listed in Table II.

EXAMPLES 12-15

Disks were cut from the dense film membrane of aryl-benzylic brominated poly(2,6-dimethyl-1,4-phenylene oxide) of Example 11. The disks had a cross-sectional area of 10.5 cm². The brominated polyarylene oxide was cross-linked by immersing the disks in a solution of about 30 percent by weight aqueous ammonia for a period in the range of 26 hours to 11 days. The temperature of the aqueous ammonia solution ranged from 23° C. to 60° C. The cross-linked membranes were washed with deionized water for at least 16 hours and then dried at 60°–80° C. in a vacuum oven. The covalently bonded, cross-linked polyarylene oxide membranes were not soluble in chloroform and did not swell appreciably in chloroform.

The disks of covalently-bonded, cross-linked polyarylene oxide membranes were subjected to permeation analysis as in Example 11. The intrinsic permeation properties—permeability and separation factor—were determined and are listed in Table II. In general permeability of the cross-linked polymer is substantially higher than the permeability of the halogenated precursor.

TABLE II

| Example | Cross-linking Treatment | Intrinsic Permeability* $P_{H_2}$ | Intrinsic Permeability* $P_{CO_2}$ | Intrinsic Permeability* $P_{O_2}$ | Separation Factor $\alpha H_2/CO$ | Separation Factor $\alpha H_2/CH_4$ | Separation Factor $\alpha CO_2/CH_4$ | Separation Factor $\alpha O_2/N_2$ |
|---|---|---|---|---|---|---|---|---|
| 11 | None          | 22  | 8  | 2.3  | 37 | 55 | 22 | 5.4 |
| 12 | 26 hr at 23° C.  | 32  | —  | —    | 31 | 61 | —  | —   |
| 13 | 36 hr at 23° C.  | 47  | 21 | —    | 31 | 68 | 28 | —   |
| 14 | 108 hr at 23° C. | 55  | 20 | 6.5  | 26 | 45 | 28 | 5.5 |
| 15 | 96 hr at 60° C.  | 104 | 42 | 13.7 | 22 | 34 | 35 | 4.9 |

*Intrinsic permeability is measured in units of $10^{-10}$ cc cm/cm²-sec-cmHg.

EXAMPLE 16

This example illustrates a procedure for forming hollow fiber membranes of brominated polyarylene oxide.

Brominated polyarylene oxide was prepared from poly(2,6-dimethyl-1,4-phenylene oxide). The brominated polyarylene oxide had a bromine content of 31.1 percent by weight and had a benzylic bromine level of 0.58 and an aryl bromine level of 0.10. The brominated polymer had a weight average molecular weight of about 86,000 and a number average molecular weight of about 43,000. A spinning solution was prepared and consisted of about 37 percent by weight of the brominated polymer and 63 percent by weight of a liquid carrier consisting of 95 percent by weight of N-formylpiperidine, 2 percent by weight acetic acid and 3 percent by weight acetic anhydride. The spinning solution was prepared by mixing for four hours to completely dissolve the brominated polymer. The brominated polymer solution was allowed to deaerate at room temperature for about 18 hours.

The deaerated brominated polymer solution was heated to about 46°–48° C. and pumped to a tube-in-orifice-type spinnerette having an orifice diameter of 508 microns, an injection tube outside diameter of 229 microns and an injection tube inside diameter of 152 microns. The spinnerette was maintained at a temperature of approximately 47° C. by the use of an external electrical heating jacket. Deionized water at ambient temperatures was fed to the injection tube at a rate sufficient to maintain the hollow fiber shape, about 1.7 milliliters per minute. The nascent hollow fiber was extruded at a rate of about 36.6 meters per minute through an air gap of about 10.2 centimeters into a coagulation bath containing running tap water. The coagulation bath was maintained at a temperature of about 9° C. The nascent hollow fiber passed vertically downward into the coagulation bath for a distance of about 17 centimeters, around a roller to a slightly upwardly slanted path through the coagulation bath and then exited from the coagulation bath. The distance of immersion in the coagulation bath was about 1 meter.

The hollow fiber from the coagulation bath was then washed with running tap water in three sequential baths having Godet rolls. In each bath, the hollow fiber was immersed for a distance of about 10 to 13 meters. The first bath was maintained at a temperature of about 8° C., while the second and third baths were at 26° C. The wet hollow fiber had an outside diameter of about 680 microns and an inner diameter of about 280 microns.

The hollow fiber, while being maintained wet with water, was wound on a bobbin using a Leesona winder. The bobbin was stored in a vessel containing running tap water for about 24 hours and then stored in tap water at about ambient temperature for about 4 to 5 days. The hollow fiber, while being maintained wet, was wound on a skeiner to form hanks of hollow fibers. The hanks of hollow fiber were hung vertically and are allowed to air dry at ambient temperature for about five days. The dried hollow fiber had an outside diameter of about 620 microns and an inner diameter of about 255 microns.

The polymer composition and spinning solution compositions are listed in Table III.

The hollow fiber membrane formation parameters are listed in Table IV.

A test bundle of 6 to 8 hollow fiber membranes each of about 12 centimeters in length, was prepared. At one end, the test bundle was embedded in epoxy to form a cylindrical tube sheet through which the bores of the hollow fibers communicate. The other end was plugged with epoxy.

While the bores of the hollow fibers in the test bundle were subjected to a vacuum (about 0.1 to 2 millimeters of mercury absolute pressure), the test bundle was dipped in a coating solution of about 1.0 percent by weight of room temperature-curable polydimethylsiloxane in n-pentane. Two 10-second dips were sufficient to effectively coat the fibers. Bore vacuum was maintained for about 10 to 15 minutes after the test bundle was removed from the coating solution. The test bundles were dried at ambient conditions for at least one day before the permeation properties of the test bundles were determined.

The permeabilities and separation factors of the uncoated test bundles and polydimethylsiloxane-coated test bundles were determined using gas mixtures in an elongated cylindrical chamber of about 150 cc. The gas mixtures were fed to the chamber to contact the outer surface of the hollow fiber membranes at pressures in a range of 10 to 100 psig. The gas mixtures passed through the chamber at a flow rate in the range of one to six liters per minute. The bores of the hollow fibers were under vacuum for about 5 to 10 minutes until the permeation reached equilibrium. Permeabilities were determined by allowing permeate gas to expand into a calibrated volume over a period of time. The permeate gas samples were then subjected to analysis. The permeability, (P/l), is expressed in GPU, which is $10^{-6}$ $cm^3(STP)/cm^2$-sec-cmHg. The dimensions, permeabilities and separation factors of the hollow fibers reported in Table IV are presented in Table V.

EXAMPLES 17–21

Hollow fiber membranes of brominated poly(2,6-dimethyl-1,4-phenylene oxide) were formed from brominated polymer solutions generally as in Example 16 except for those differences in composition listed in Table III and except for those differences in spinning parameters listed in Table IV.

Test bundles were prepared for determination of permeation properties as in Example 16. The hollow fiber membrane dimensions, permeabilities and separation factors are listed in Table V.

TABLE III

| | Polymer Composition | | | | Polymer In Spinning Solution |
|---|---|---|---|---|---|
| | | Bromine Distribution/ Repeat Unit | | | |
| Example | Wt % Br | Aryl | Benzylic | Liquid Carrier (Wt %) | Wt % |
| 16 | 31.1 | 0.10 | 0.58 | N—Formylpiperidine (95) Acetic Acid (2) Acetic Anhydride (3) | 37 |
| 17 | 32.7 | 0.15 | 0.57 | N—Formylpiperidine (95) Acetic Acid (2) Acetic Anhydride (3) | 37 |
| 18 | 33.4 | 0.19 | 0.56 | N—Formylpiperidine (78) Acetic Acid (20) Acetic Anhydride (2) | 32 |
| 19 | 33.4 | 0.19 | 0.56 | N—Formylpiperidine (78) Sulfolane (20) Acetic Anhydride (2) | 32 |
| 20 | 33.4 | 0.19 | 0.56 | N—Methyl-2-Pyrrolidone (78) Sulfolane (20) Acetic Anhydride (2) | 32 |
| 21 | 53.5 | 1.02 | 0.68 | N—Formylpiperidine (88) Acetic Acid (10) | 37 |

TABLE III-continued

| | Polymer Composition | | | | Polymer In |
|---|---|---|---|---|---|
| | | Bromine Distribution/ Repeat Unit | | | Spinning Solution |
| Example | Wt % Br | Aryl | Benzylic | Liquid Carrier (Wt %) | Wt % |
| | | | | Acetic Anhydride (2) | |

TABLE IV

| Example | Spinnerette OD (μ) ID (μ) Capillary (μ) | Extrusion Speed m/min. | Dope Rate cc/min. | Spinnerette Temp. °C. | Bore Injection cc/min. | Temperature, °C. Coag | 1st Bath | 2nd Bath | 3rd Bath |
|---|---|---|---|---|---|---|---|---|---|
| 16 | 508/229/152 | 36.6 | — | 47 | 1.7 | 9 | 8 | 26 | 26 |
| 17 | 457/127/76 | 33.5 | 8.5 | 47 | 0.6 | 6 | 5 | 24 | 25 |
| 18 | 457/127/76 | 19.8 | 5.9 | 35 | 1.7 | 10 | 20 | 11 | 20 |
| 19 | 533/203/127 | 18.9 | 6.0 | 31 | 2.8 | 10 | 10 | 13 | 20 |
| 20 | 533/203/127 | 30.8 | 8.5 | 22 | 2.1 | 16 | 10 | 10 | 20 |
| 21 | 457/127/76 | 33.5 | 8.5 | 30 | 0.6 | 5 | 5 | 24 | 25 |

TABLE V

| | | Permeability $(1 \times 10^6)$ GPU | | | | Separation Factors | | | |
|---|---|---|---|---|---|---|---|---|---|
| | Membranes OD/ID | Before Coating | | After Coating | | Before Coating | | After Coating | |
| Example | (microns) | $(P/l)_{H_2}$ | $(P/l)_{CO_2}$ | $(P/l)_{H_2}$ | $(P/l)_{CO_2}$ | $\alpha H_2/CH_4$ | $\alpha CO_2/CH_4$ | $\alpha H_2/CH_4$ | $\alpha CO_2/CH_4$ |
| 16 | 620/255 | 202 | 79 | 94 | 39 | 3.2 | 1.1 | 25 | 12 |
| 17 | 480/140 | 72 | 21 | 62 | 21 | 16.0 | 5 | 49 | 19 |
| 18 | 510/300 | 328 | — | 232 | 91 | 6.0 | — | 48 | 19 |
| 19 | 590/375 | 365 | — | 226 | — | 5.6 | — | 45 | — |
| 20 | 555/265 | 2040 | — | 216 | — | 1.7 | — | 44 | — |
| 21 | 355/140 | 184 | — | 100 | 42 | 4.3 | — | 53 | 23 |

EXAMPLE 22

This example illustrates the cross-linking of halogenated polyarylene oxide hollow fiber membranes. The brominated poly(2,6-dimethyl-1,4-phenylene oxide) hollow fiber membrane prepared in Example 17 was cross-linked by reaction with anhydrous ammonia gas. The hollow fiber membranes were collected into a test bundle. One end of the bundle was embedded in epoxy to form a tube sheet. The hollow fiber membranes were not coated. The test bundle was sealed in a 300 cc steel cylinder such that the bores of the hollow fibers were open to the atmosphere.

Anhydrous ammonia gas was fed into the cylinder at a rate sufficient to maintain a pressure slightly higher than atmospheric inside the cylinder. The membranes were exposed to ammonia gas at ambient temperature for 24 hours. Permeabilities and separation factors were determined; these permeation properties of the membrane exposed to ammonia gas are listed in Table VI.

The hollow fiber membranes were soaked in deionized water for 20 hours at 23° C. The membranes were then dried under nitrogen at 23° C. Permeabilities and separation factors were determined; these permeation properties of the washed and dried membrane are listed in Table VI.

The hollow fiber membranes were then coated with polydimethylsiloxane as in Example 16. Permeabilities and separation factors were determined; these permeation properties of the coated membrane are listed in Table VI.

TABLE VI

| Membrane | Permeability (GPU) $(P/l)H^2$ | $(P/l)CO_2$ | Separation Factor $\alpha H_2/CH_4$ | $\alpha CO_2/CH_4$ |
|---|---|---|---|---|
| Hollow Fiber | 72 | 21 | 16 | 5 |

TABLE VI-continued

| Membrane | Permeability (GPU) $(P/l)H^2$ | $(P/l)CO_2$ | Separation Factor $\alpha H_2/CH_4$ | $\alpha CO_2/CH_4$ |
|---|---|---|---|---|
| Membrane of Ex. 17 | | | | |
| Exposed to Ammonia Gas | 36 | 8 | 28 | 7 |
| Washed and Dried | 90 | — | 28 | — |
| Coated | 83 | 21 | 74 | 27 |

EXAMPLE 23

This example illustrates cross-linking of halogenated polyarylene oxide membranes by reaction with solutions of ammonia.

Hollow fiber membranes were spun from the spinning solution, and under the conditions, of Example 17. The hollow fiber membranes of brominated poly(2,6-dimethyl-1,4-phenylene oxide) had an outer diameter of about 480 microns and an inner diameter of about 133 microns. The hollow fiber membranes were formed into five test bundles, 23A-23E. The permeabilities and separation factors of the test bundles were determined as in Example 16; these permeation properties of the precursor hollow fiber membrane are listed in Table VII. Except for bundle "23A", the test bundles were then immersed in aqueous and organic solutions saturated with ammonia for periods ranging from 4 to 96 hours. The test bundles were then washed and dried. Permeabilities and separation factors were determined as in Example 16; these permeation properties of the treated hollow fiber membranes are listed in Table VII.

All of the test bundles of hollow fiber membranes were coated with polydimethylsiloxane. Permeation properties were again determined for the coated hollow fiber membranes; these are listed in Table VII.

TABLE VII

| Bundle | Hollow Fiber Membrane | (P/l)H$_2$ (GPU) | αH$_2$/CH$_4$ | (P/l)CO$_2$ (GPU) | αCO$_2$/CH$_4$ |
|---|---|---|---|---|---|
| 23A | Precursor | 113 | 9 | — | — |
| | Coated | 99 | 43 | 40 | 18 |
| 23B | Precursor | 103 | 11 | 37 | 4 |
| | Treatment: 16 hrs in 5.4 M NH$_3$/Formamide; washed 24 hrs with Formamide; dried 3 days in N$_2$ at 23° C. | 79 | 41 | 21 | 18 |
| | Coated | 84 | 63 | 32 | 25 |
| 23C | Precursor | 127 | 8 | — | — |
| | Treatment: 16 hrs in 5.7 M NH$_3$/Glycerin; 8 hrs in 10% aqueous glycerin; 16 hrs in DI water; dried 4 days in N$_2$ at 23° C. | 107 | 4 | — | — |
| | Coated | 115 | 57 | 40 | 24 |
| 23D | Precursor | 121 | 8 | — | — |
| | Treatment: 16 hrs in 1:1 (vol) conc. NH$_4$OH/Methanol; washed with 1:1 water/methanol; dried 1 day with N$_2$ at 23° C. | 203 | 23 | 64 | 11 |
| | Coated | 121 | 84 | 36 | 32 |
| 23E | Precursor | 108 | 9.8 | — | — |
| | Treatment: 24 hrs in conc. NH$_4$OH; washed 24 hrs in DI water; dried 3 days in N$_2$ at 23° C. | 118 | 37 | — | — |
| | Coated | 93 | 84 | 23 | 24 |

EXAMPLE 24

This example illustrates the cross-linking of halogenated polyarylene oxide hollow fiber membranes with ammonia solution at higher temperatures. Such cross-linked polyarylene oxide membranes exhibit higher permeabilities as the cross-linking reaction temperature is increased.

Hollow fiber membranes were prepared from the same spinning solution, and under the same spinning conditions, as in Example 16. The hollow fiber membranes of brominated poly(2,6-dimethyl-1,4-phenylene oxide) were cross-linked by immersion in aqueous solution of concentrated ammonia. Fibers sufficient for four test bundles, 24A, 24B 24C and 24D, were immersed in the ammonia solution at temperatures of 60° C., 80° C., 100° C. and 120° C., respectively, for about 24 hours. The test fibers were then immersed in a deionized water bath for 24 hours. Fibers of test bundle 24A, reacted at 60° C., were immersed in water at 60° C., the other bundles were immersed in water at 80° C.

The fibers were then dried for about 20 hours in a forced air oven at 80° C.

The test bundles were then analyzed for permeation properties as in Example 16. The permeabilities and separation factors for the bundles of dried hollow fiber membranes are listed in Table VIII.

The hollow fiber membranes were then coated with polydimethylsiloxane. The permeabilities of separation factors for the coated hollow fiber membranes are listed in Table VIII.

TABLE VIII

| Membrane Bundle | Dried | | | | Coated | | | |
|---|---|---|---|---|---|---|---|---|
| | (P/l)H$_2$ | αH$_2$/CH$_4$ | (P/l)CO$_2$ | αCO$_2$/CH$_4$ | (P/l)H$_2$ | αH$_2$/CH$_4$ | (P/l)CH$_2$ | αCO$_2$/CH$_4$ |
| 20A | 217 | 5.3 | 44 | 1.8 | 157 | 91 | 40 | 32 |
| 20B | 244 | 5.3 | 85 | 2.1 | 169 | 112 | 50 | 35 |
| 20C | 227 | 7.3 | 73 | 3.1 | 166 | 90 | 50 | 37 |
| 20D | 343 | 4.5 | 122 | 2.0 | 226 | 96 | 67 | 34 |

Permeabilities are in units of GPU, that is $10^{-6}$ cc/cm$^2$-sec-cmHg.

EXAMPLE 25

This example illustrates the resistance of cross-linked polyarylene oxide membranes to adverse chemical species. Such membranes are able to retain their physical structure and morphology as well as permeation properties.

Hollow fiber membranes were spun from the spinning solution, and under the conditions, of Example 17. The hollow fiber membrane of brominated poly(2,6-dimethyl-1,4-phenylene oxide) was formed into three test bundles 25A, 25B and 25C.

Test bundle 25A was analyzed for base permeation properties, coated with polydimethylsiloxane and analyzed against for permeation properties. The permeabilities and separation factors for test bundle 25A in a base state and in a cooled state are listed in Table IX.

The hollow fiber membranes in test bundles 25B and 25C were cross-linked by immersion for 24 hours in concentrated aqueous ammonia at 23° C. The membranes were then washed for 24 hours in deionized water at 23° C. The membranes were dried in nitrogen for three days. Permeation properties were obtained for the cross-linked membranes and are reported in Table IX for test bundle 25B. Test bundle 25B was then coated with polydimethylsiloxane and the permeation properties determined for the coated cross-linked membranes are listed in Table IX.

Test bundle 25C, of cross-linked polyarylene oxide membranes, was subjected to exposure to carbon tetrachloride by twice dipping the membranes under bore vacuum into the carbon tetrachloride for 10 seconds. The bundle was aged for seven days. Permeation properties were determined. The bundle was then immersed in deionized water for one minute under bore vacuum. The bundle was dried in nitrogen for four days at 23° C. Permeation properties were determined. The bundle was immersed for 3½ hours in deionized water, then dried for one hour in air at 100° C. Permeation properties were determined one hour later and 18 days later.

The sequential determinations of permeation properties for test bundle 25C are listed in Table IX.

As indicated in Table IX, polyarylene oxide membranes in hollow fiber form have varying permeation properties depending on the nature of the polymer. Membranes of the polymer having active halogens exhibit high permeability and moderate separation factor. When such membranes are coated, say with a siloxane, permeability is decreased slightly but separation factor is substantially increased. Alternatively when such membranes are not coated but treated with a cross-linking agent, they may show a slight increase in permeability as well as a significant increase in separation factor. The membrane of cross-linked polymer after being coated will show a slight decrease in permeability coupled with a substantial increase in separation factor. Such general trends in permeation properties can be effected depending on the desired properties for such polyarylene oxide membranes.

TABLE IX

| Bundle | Treatment | $(P/l)H_2$ | $\alpha H_2/CH_4$ | $(P/l)CO_2$ | $\alpha CO_2/CH_4$ |
|---|---|---|---|---|---|
| 25A,B,C | Base | 113 | 9 | — | — |
| 25A | Coated | 99 | 43 | 40 | 18 |
| 25B,C | 24 hrs in conc. $NH_4OH$ at 23° C.; washed 24 hrs in DI water at 23° C.; dried 3 days in $N_2$ | 119 | 19 | — | — |
| 25B | Coated | 93 | 84 | 23 | 24 |
| 25C | Exposed to carbon tetrachloride | 88 | 55 | 21 | 17 |
| 25C | One minute immersion in water | 95 | 54 | 27 | 20 |
| 25C | Three days later | 78 | 79 | 19 | 22 |
| 25C | 3.5 hrs immersion in water | 143 | 31 | 56 | 17 |
| 25C | 18 days later | 98 | 56 | 34 | 24 |

Permeabilities are in units of GPU.

branes were then coated with polydimethylsiloxane. The hollow fiber membranes were again analyzed for permeation properties. These permeation properties are listed in Table X.

Fibers (26B) were immersed for 21 days in a 0.6 percent aqueous solution of hydroxyl amine at 23° C. The fibers were then immersed in deionized water for 24 hours at 23° C. The fibers were then dried for 20 hours at 80° C. The permeation properties of the hollow fiber membranes (26B) were determined. After the hollow fiber membranes were coated with polydimethylsiloxane the permeation properties were again determined.

Test fibers (26C) were immersed for 24 hours in a 1 percent aqueous solution of hydrazine at 100° C. The test fibers were then placed in deionized water at 80° C. for 24 hours. The test fibers were then dried for 22 hours at 80° C. The permeation properties of the hollow fiber membranes (26C) were determined. After the hollow fiber membranes were coated with polydimethylsiloxane the permeation properties were again determined.

Test fibers (26D) were immersed in water at 100° C. for 24 hours. The fibers were then placed in water at 80° C. for another 24 hours. The fibers were then dried for 20 hours at 80° C. Permeation properties of the hollow fiber membranes (26D) were determined. After the hollow fiber membranes were coated with polydimethylsiloxane permeation properties were again determined.

Test fibers (26E) were immersed for 24 hours in a 5 percent by weight aqueous solution of sodium hydroxide at 100° C. The fibers were then immersed for 24 hours in water at 80° C. The fibers were then dried for 22 hours at 80° C. Permeation properties were determined for bundle (26E). After the hollow fiber membranes had been coated with polydimethylsiloxane the permeation properties were again determined.

Permeation properties, permeability and separation factor, for test bundles 26A–26E both before and after coating are listed in Table X.

TABLE X

| Membrane Bundle | Before Coating | | | | After Coating | | | |
|---|---|---|---|---|---|---|---|---|
| | $(P/l)H_2$ | $\alpha H_2/CH_4$ | $(P/l)CO_2$ | $\alpha CO_2/CH_4$ | $(P/l)H_2$ | $\alpha H_2/CH_4$ | $(P/l)CO_2$ | $\alpha CO_2/CH_4$ |
| 26A | 125 | 5.8 | 31 | 1.8 | 79 | 99 | 21 | 32 |
| 26B | 211 | 3.4 | 78 | 1.4 | 115 | 60 | 38 | 24 |
| 26C | 189 | 3.9 | 57 | 1.4 | 99 | 81 | 31 | 31 |
| 26D | 109 | 6 | 39 | 2.6 | 86 | 55 | 28 | 23 |
| 26E | 77 | 7.6 | 16 | 2.0 | 59 | 170 | 11 | 41 |

Permeabilities are in units of GPU.

EXAMPLE 26

This examples illustrates the cross-linking of polyarylene oxide membranes with a variety of cross-linking agents.

Hollow fiber membranes of brominated poly(2,6-dimethyl-1,4-phenylene oxide) prepared in Example 16 were reacted loose, rinsed and dried and then formed into five test bundles designated 26A, 26B, 26C, 26D and 26E.

Test fibers (26A) were immersed for seven days in a 10 percent aqueous solution of methylamine at 23° C. The fibers were stored for 24 hours in deionized water at 80° C. The fibers were dried for 22 hours at 80° C. The bundle (26A) of hollow fiber membranes was analyzed for permeation properties. The hollow fiber mem-

EXAMPLE 27

This example illustrates the cross-linking of polyarylene oxide membranes with a variety of cross-linking agents. Hollow fiber membranes of brominated poly(2,6-dimethyl-1,4-phenylene oxide) prepared in Example 18 were assembled into seven bundles of loose hollow fiber, designated as bundles 27A–27G.

The hollow fiber membranes of bundle 27A were not subjected to cross-linking. The hollow fiber membranes were assembled into a test bundle. Permeation properties were determined before and after the hollow fiber membranes in the test bundle were coated with polydimethylsiloxane. These permeation properties are reported in Table XI.

The other test bundles, 27B–27G, were subjected to cross-linking reactions before they were assembled into test bundles having tube sheets. The loose bundles of hollow fiber membranes were each immersed in a 5 percent by weight aqueous solution of a specific cross-linking agent at 60° C. for 65 hours. The respective cross-linking agents for bundles 27B–27G are listed in Table XI. The bundles of cross-linked polyarylene oxide hollow fiber membranes were then immersed for 30 minutes in water and then dried first for 30 minutes at 60° C. and then for 60 minutes at 100° C. Permeation properties for test bundles 27B–27G were determined both before and after coating with polydimethylsiloxane. These permeation properties are listed in Table XI.

TABLE XI

| Membrane Bundle | Cross-Linking Reagent | Before Coating (P/l)H₂ × 10⁶ | αH₂/CH₄ | After Coating (P/l)H₂ | αH₂/CH₄ |
|---|---|---|---|---|---|
| 27A | None | 328 | 6 | 232 | 48 |
| 27B | Piperazine | 157 | 14 | 157 | 144 |
| 27C | 1,2,3-Triazole | 49 | 41 | 70 | 101 |
| 27D | Imidazole | 97 | 17 | 86 | 133 |
| 27E | 2-Ethyl-4-Methyl Imidazole | 3 | 98 | 3 | 194 |
| 27F | Thiosemi-carbazide | 19 | 14 | 30 | 186 |
| 27G | Bis-dimethyl-amino-2-propanol | 9 | 6.6 | 7 | 99 |

Permeabilities are in units of GPU.

EXAMPLE 28

This example illustrates the preparation of a polyarylene oxide substituted with a halogenated acetyl group. The example further illustrates the formation of a membrane from such polymer and the cross-linking of the membrane.

Five grams of poly(2,6-dimethyl-1,4-phenylene oxide) having a weight average molecular weight, MW of 49,000 was dissolved in 100 ml of 1,2-dichloroethane. Some of the solvent was distilled to remove water. 7.5 grams of chloroacetic anhydride and 0.5 milliliters of trifluoromethyl sulfonic acid were added to the solution which was then heated to a boil. The solution was allowed to reflux for two hours while protected with a drying tube. After the solution was cooled to room temperature, three grams of potassium carbonate was added and the mixture stirred for 25 minutes. The solution was filtered and added to 1600 milliliters of methanol causing the chloroacetylated polyarylene oxide to precipitate. The halogenated polymer was washed with methanol and dried for three days at 50° C. in a vacuum oven. The yield was 6.1 grams (about 75 percent of the theoretical yield). The polymer was found by microelemenetal analysis to contain 67.1 percent carbon, 5.5 percent hydrogen and 11.6 percent chlorine. Calculations, based on the chlorine content, indicated the polymer contained about 0.53 chloroacetyl groups per repeating monomeric unit.

Dense film membranes of the chloroacetylated poly(2,6-dimethyl-1,4-phenylene oxide) polymer were cast from chloroform. The permeation properties for membranes of this halogenated precursor polymer were determined.

The membrane was treated with concentrated ammonium hydroxide at 60° C. for six days. The permeation properties of the ammonia cross-linked polymer were determined. The permeation properties are listed in Table XII.

TABLE XII

| | $P_{H_2}$ | $P_{O_2}$ | $P_{CO_2}$ | $\alpha H_2/CH_4$ | $\alpha O_2/N_2$ | $\alpha CO_2/CH_4$ |
|---|---|---|---|---|---|---|
| Precursor | 58 | 9 | 44 | 24 | 4.7 | 21 |
| NH₃ Cross-linked | 77 | 10 | 49 | 34 | 4.7 | 26 |

Intrinsic permeabilities are in units of 10⁻¹⁰ cc cm/cm²-sec-cmHg.

EXAMPLE 29

This example illustrates a gas separation membrane of this invention comprising a covalently bonded cross-linked polymer of a polysulfone precursor and a chemical cross-linking agent. This example also illustrates that the cross-linking processes of this invention are applicable to a wide variety of polymers which have phenyl rings. Such phenyl rings are present in these polysulfone polymers, which may for instance be represented by the structural formula

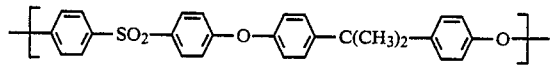

Derivatives of such polysulfones can be prepared which may serve as useful precursor for cross-linking reaction. One such derivative is poly(bis-ortho-cresol acetone phenyl sulfone ether) which is represented by the structural formula

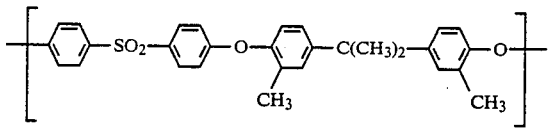

Such polymer can be halogenated at the benzylic position to provide a precursor polymer which can be cross-linked by reaction with a cross-linking agent, for instance ammonia.

Poly(bis-ortho-cresol acetone phenyl sulfone ether) was halogenated at the benzylic position by adding bromine to a boiling solution of the polymer in chlorobenzene. Bromine was added at a 1:1 molar ratio of Br₂ per polymer unit. The resulting brominated polymer precursor had 0.79 benzylic bromine atoms per polymer unit. The brominated polymer precursor formed strong flexible films which could be blended with other polysulfone polymers. Such blended polymers generally formed clear solutions and transparent films indicating a degree of compatability.

Dense film membranes were cast from the brominated polymer precursor. Such membranes were cross-linked by soaking the membranes in a solution of concentrated ammonium hydroxide. Such cross-linked films are insoluble in solvents for the brominated polymer precursor.

Permeation properties for the precursor and cross-linked membranes are listed in Table XIII.

TABLE XIII

| | $P_{H_2}$ | $P_{CO_2}$ | $P_{O_2}$ | $\alpha H_2/CH_4$ | $\alpha CO_2/CH_4$ |
|---|---|---|---|---|---|
| Precursor | 6.4 | 2.6 | 0.6 | 70 | 29 |
| Cross-Linked | 6.9 | 1.6 | 0.4 | 160 | 45 |

TABLE XIII-continued

| $P_{H_2}$ | $P_{CO_2}$ | $P_{O_2}$ | $\alpha H_2/CH_4$ | $\alpha CO_2/CH_4$ |
|---|---|---|---|---|
| | $\alpha H_2/CO$ | $\alpha O_2/N_2$ | | |

Intrinsic permeabilities are in units of $10^{-10}$ cc-cm/cm$^2$-sec-cmHg.

The foregoing description of embodiments of this invention is not intended to be a limitation to the scope of the invention. As will be apparent to those skilled in the art, many variations and modifications can be made to the compositions of this invention as described in the above embodiments without departing from the spirit and scope of this invention.

We claim:

1. A process for separating at least one gas in a gaseous mixture from at least one other gas in said gaseous mixture by selective permeation and providing a permeating product containing at least one permeating gas, comprising: contacting the gaseous mixture with one side of a gas separation membrane having a asymmetric wall structure with a thin dense skin, said skin having pores, and said membrane having a coating in occluding contact with the pores of the thin dense skin, which with respect to at least one pair of gases of said gaseous mixture, the gas separation membrane exhibits selective permeation of one gas of said pair of gases over that of the remaining gases, the gas separation membrane is comprised of a covalently bonded cross-linked polymer of a polyarylene oxide precursor of 2,6-dimethyl-1,4-phenylene oxide having substituent groups selected from the group consisting of benzylic halogen at from 0.01 to 2.0 halogen atoms per phenylene oxide unit, halogenated acetyl at from 0.01 to 1.0 halogenated acetyl groups per phenylene oxide unit and halogenated propionyl at from 0.01 and 1.0 halogenated propionyl groups per phenylene oxide unit; and a chemical cross-linking agent selected from the group consisting of ammonia and aqueous solution of ammonia hydroxide; maintaining the opposite surface of the gas separation membrane at a lower chemical potential for said at least one permeating gas permeating said at least one permeating gas into and through the gas separation membrane; and removing from the vicinity of said opposite surface a permeated product having a different portion of said at least one gas.

2. The process of claim 1 wherein the gas separation membrane is a hollow fiber membrane.

3. A gas separation membrane comprising a covalently bonded cross-linked polymer of a polyarylene precursor, the precursor having at least 0.01 substituent per arylene oxide unit wherein said substituent is selected from the group consisting of a halogenated alkyl group and a halogen acyl group; and a chemical cross-linking agent selected from the group consisting of ammonia and a solution of ammonia.

4. The membrane of claim 3 wherein the cross-linking extends substantially throughout the membrane.

5. The membrane of claim 4 wherein the mmbrane has an asymmetric wall structure with a thin dense skin.

6. The membrane of claim 1 wherein the polyarylene oxide precursor comprises 2,6-dimethyl-1,4-phenylene oxide having substituent group selected from the group consisting of benzylic halogen at from 0.01 to 2.0 halogen atoms per phenylene oxide unit, halogenated acetyl at from 0.01 to 1.0 halogenated acetyl groups per phenylene oxide unit and halogenated propionyl at from 0.01 to 1.0 halogenated propionyl groups per phenylene oxide unit.

7. The membrane of claim 6 wherein the thin dense skin has pores and the membrane has a coating in occluding contact with the pores of the thin dense skin.

8. The membrane of claim 7 which is a hollow fiber membrane.

9. A gas separation membrane comprising a covalently co-bonded, cross-linked polymer of a polyarylene oxide precursor, the precursor having at least 0.01 substituent per arylene oxide unit wherein said substituent is selected from the group consisting of a halogenated alkyl group and a halogenated acyl group; and a chemical cross-linking agent comprised of compounds selected from the group consisting of water and an aqueous base solution.

10. The membrane of claim 9 wherein the membrane has an asymmetric wall structure with a thin dense skin.

11. The membrane of claim 10 wherein the polyarylene oxide precursor comprises 2,6-dimethyl-1,4-phenylene oxide having substituent groups selected from the group consisting of benzylic halogen at from 0.01 to 2.0 halogen atoms per phenylene oxide unit, halogenated acetyl at from 0.01 to 1.0 halogenated acetyl groups per phenylene oxide unit and halogenated propionyl at from 0.01 to 1.0 halogenated propionyl groups per phenylene oxide unit.

12. The membrane of claim 11 wherein the thin dense skin has pores and the membrane has a coating in occluding contact with the pores of the thin dense skin.

13. The membrane of claim 12 which is a hollow fiber membrane.

* * * * *